July 29, 1930.  C. A. HOXIE  1,771,925
FILM MARKING APPARATUS
Filed May 16, 1928
Fig.1.
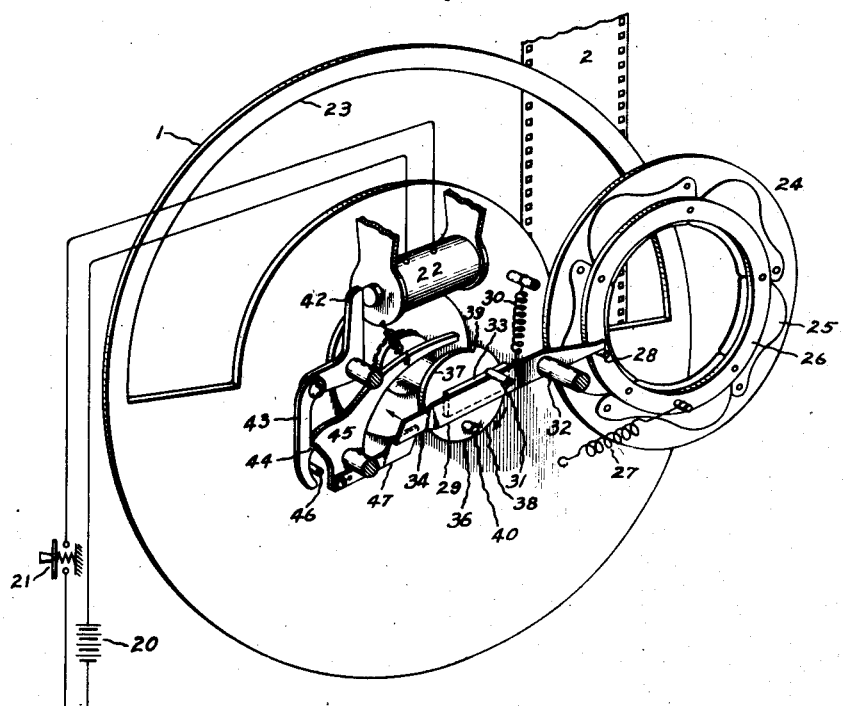
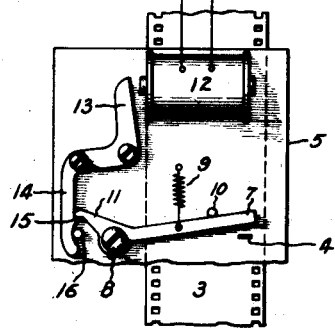
Fig.2.  Fig.3.
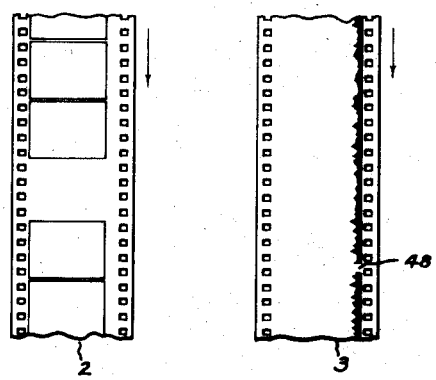
Fig.4.
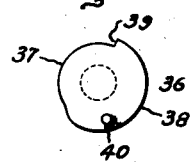
Inventor
Charles A. Hoxie,
by Charles E. Tullar
His Attorney.

Patented July 29, 1930

1,771,925

UNITED STATES PATENT OFFICE

CHARLES A. HOXIE, OF ALPLAUS, NEW YORK, ASSIGNOR TO GENERAL ELECTRIC COMPANY, A CORPORATION OF NEW YORK

FILM-MARKING APPARATUS

Application filed May 16, 1928. Serial No. 278,221.

My invention relates to apparatus for simultaneously making motion picture and sound records on separate films and it relates particularly to apparatus of this character having means by which the records may be interrupted to produce marks of reference on the respective films to indicate corresponding time relations.

One of the objects of my invention is the provision of improved means for producing a reference mark on a motion picture film whereby one and only one picture is omitted each time the reference mark is made. Another object of my invention is the provision of improved manually controlled means for making a mark of reference on a film of a predetermined short length which is independent of the length of time the manual means is held in operated position. A further object of my invention is to provide in apparatus for simultaneously making motion picture and sound records on separate films, means responsive to a single control member for causing the omission of a single picture and for causing a short interruption in the sound record, said interruption and the omitted picture having a predetermined time relation.

My invention will be better understood from the following description taken in connection with the accompanying drawing, and its scope will be pointed out in the appended claims.

Referring to the drawing, Figure 1 is a perspective view of apparatus embodying my invention; Figs. 2 and 3 show respectively the picture and sound film records; and Fig. 4 shows a detail.

The motion picture camera may be of any suitable type examples of which are well known and for that reason is not illustrated except that portion of it, namely the rotating shutter 1, by which the passage of light to the film 2 is controlled. The sound recorder also may be of any well known type and in the present case is adapted to make the sound record along one edge of the sound film 3 adjacent the row of sprocket holes. The light which varies in accordance with the sound is directed through the rectangular opening 4 in the screen 5 arranged in front of the film. Shutter 7 shown pivoted at 8 to the screen is adapted to swing over and cover the opening 4. It is normally held by the spring 9 against the stop 10 and has the tail 11 by which it is operated. In front of the operating electro-magnet 12 is the armature 13 shown as a bell crank lever to which is pivoted the link 14. This link has the projection 15 for engaging and operating the lever 7 and has a face which is curved or inclined constituting a cam which is engaged by the fixed pin 16. The relation of the parts is such that when the magnet is energized the shutter is quickly moved to a position covering the opening but in this position the projection on the link is pushed off the end of the tail 11 whence the shutter is immediately restored by the spring 9. An interruption in the sound record of very short duration is thereby made, which for example may be about 1/16 of an inch in a film moving 90 feet per minute. The magnet 12 is shown connected in a circuit including the battery 20, the manual switch 21 and the electromagnet 22 which forms a part of the camera interrupting apparatus now to be described.

The aforementioned shutter forming a part of the motion picture camera is shown as a disk having a semicircular light opening 23 through which passes the light forming the image on the film. In the path of the light is the shutter 24 shown as the iris type, the cooperating movable segments 25 of which are moved in and out by rotative movement of the ring 26. The small coil spring 27 attached at one end to a pin on the ring 26 serves to move the shutter to closed position but the shutter is normally maintained in opened position by the engagement of the pin 28 with lever 29, coil spring 30 serving to hold the lever in the position illustrated against the stop pin 31. Lever 29 is pivoted at 32 and preferably is of light resilient material having the plate 33 attached to one face thereof and having its end portion 34 given a slight twist. Mounted to rotate with the shutter 1 is the cam 36 which as shown more distinctly in Fig. 4 has the inner and outer concentric portions, 37 and 38 respectively, connected by the shoulder 39. Projecting from the cam is the pin 40 by which the lever 29 is operated.

To the armature 42 of electromagnet 22 is pivoted the link 43 which members are similar in construction to members 13 and 14 of shutter 7 of the sound recorder already described. Projection 44 on link 43 engages a shoulder on lever 45 from which it is afterward pushed off because of the fixed pin 46. Lever 45 has one portion which engages the cam face of the cam 36 and has another extension 47 which is given a partial twist and engages the end 34 of lever 29.

When it is desired to make simultaneous marks on the picture and sound record films the operator closes the switch 21, thereby energizing the two magnets 12 and 22. In the sound recording part of the apparatus shutter 7 is thereby caused quickly to cover and uncover the light opening 4 producing the short break shown at 48 in the sound record. At the same time lever 45 is moved into engagement with cam 36. If at that instant the cam is in such a position that the lever engages the inner concentric portion 37, link 43 will become detached therefrom and portion 47 which heretofore has held the lever 29 out of the path of pin 40 will release this lever allowing it to spring back to a position where the pin will engage the top of plate 33 and rock the lever counterclockwise against the force of spring 30. On its return movement the end 34 of lever 29 is deflected outward by the portion 47 of lever 45 whence it is released from pin 40. This movement of lever 29 is more than enough to allow the shutter 24 to completely close so that this shutter remains closed approximately for a full half turn of shutter 1, the parts being so timed that the closing and opening movements of shutter 24 occur during the intervals of darkness the shutter remaining closed during the intermediate interval when the film normally is being exposed. The result is that a single picture only is left blank or unexposed in response to the closing of the switch 21. If at the time the switch 21 is closed the cam 36 is in such a position that lever 45 engages the outer concentric portion 38, link 43 is not detached and lever 29 is not freed until the cam rotates to the position at which lever 45 will drop off the shoulder 39. With this apparatus the blank picture will be displaced somewhat behind the break in the sound record but it has been found that the variation in such displacement will never be more than one half of the width of a picture. In making a combined print of the picture and sound records so marked, the films may easily be arranged with the two reference marks displaced the proper distance from each other considering also the above mentioned displacement to suit the reproducing apparatus so as to produce the necessary accuracy for proper synchronization in the reproduction.

Where separate films bearing respectively the picture and sound records are used in the reproduction instead of a single film having both records thereon, the above described reference marks enable the operator to start the two films in the proper relation to give the necessary synchronization of the motions and sound produced.

I have chosen the particular embodiment described above as illustrative of my invention and it will be apparent that various modifications may be made without departing from the spirit and scope of my invention which modifications I aim to cover by the appended claims.

What I claim as new and desire to secure by Letters Patent of the United States, is:

1. In a motion picture camera having means for successively exposing a film, a shutter arranged to interrupt the exposure of the film, and means operatively connecting the shutter and the camera for causing the interruption of the exposure to be limited to a single picture.

2. In a motion picture camera having means for successively exposing a film, means for making a reference mark on the film comprising a shutter arranged in the path of the exposing light, operating means therefor, and means controlled by the camera for limiting the closure of said shutter to a single picture.

3. In a motion picture camera having means for successively exposing a film to form a series of pictures, a circuit controlling member and means responsive to the operation of said member for causing the omission of one of said pictures, said means being controlled by the mechanism of the camera whereby a single picture only is omitted.

4. In a motion picture camera, a shutter for interrupting the exposure of a film in the camera, and a manually operated member for controlling the operation of the shutter, said shutter having means for limiting its operation to the interruption of a single picture independently of the duration of operation of the manually operated member.

5. In apparatus for recording sound on a film wherein a beam of light directed on a film is caused to vary in accordance with the sound, a shutter arranged to be moved to a position to interrupt the beam of light, an operating magnet therefor, and a connection between the magnet and the shutter arranged to become automatically released when the shutter is moved to said position and means for withdrawing the shutter from said position.

6. In a motion picture camera, a shutter for interrupting the exposure of a film therein, a manually operable switch, a magnet in circuit therewith arranged to control the operation of said shutter, and means effective at each operation of said magnet to limit the interruption of said exposure to a single picture independently of the length of time the switch is held operated.

7. In a motion picture camera having means including a rotary element for successively exposing a film to form a series of pictures, a shutter arranged in the path of the exposing light having an operating member arranged to be engaged by said rotary element, a manually operated switch, an electro-magnet controlled thereby, and means including a self releasing connection between the magnet and the operating member whereby at each closure of the switch the rotary element effects a single closing and opening operation only of the shutter.

In witness whereof I have hereunto set my hand this 15th day of May, 1928.

CHARLES A. HOXIE.